United States Patent

Haas, Jr.

[15] 3,662,125

[45] May 9, 1972

[54] TELEPHONE LINE TESTING ARRANGEMENT

[72] Inventor: Charles William Haas, Jr., Middletown, N.J.

[73] Assignee: Bell Telephone Laboratories Incorporated, Murray Hill, N.J.

[22] Filed: June 3, 1970

[21] Appl. No.: 43,079

[52] U.S. Cl. ....................................179/175.2 R, 179/175.3

[51] Int. Cl.........................................H04m 3/22, H04b 3/46

[58] Field of Search...........179/175.3, 175.2 R, 18 E, 18 AF, 179/18 F, 18 FA

[56] References Cited

UNITED STATES PATENTS 3,371,165 2/1968 Earle et al...........................179/175.3

*Primary Examiner*—Kathleen H. Claffy
*Assistant Examiner*—Douglas W. Olms
*Attorney*—R. J. Guenther and James Warren Falk

[57] ABSTRACT

A four-wire communication system for interconnecting wideband lines is disclosed. The continuity and transmission characteristics of the selected network channels and the four-wire lines are tested prior to each use. The test is made by transmitting a predetermined signal over a pair of wires and, through a loopback arrangement, returned over the other pair of wires. The returned signal is then compared with signals of preselected value and if the test is satisfactory, the loopback arrangement is removed.

13 Claims, 7 Drawing Figures

INVENTOR
C. W. HAAS, JR.
BY Charles H. Davis
ATTORNEY

WIDEBAND CONTINUITY & TRANSMISSION TEST CIRCUIT

TELEPHONE LINE TESTING ARRANGEMENT

BACKGROUND OF THE INVENTION

This invention relates to communication systems and particularly to arrangements for testing facilities prior to using the facilities for communication. In a more particular aspect, this invention relates to an arrangement for testing the continuity and transmission qualities of a communication path each time a path is selected and established for use.

A communication system can generally be divided functionally into a switching network for establishing communication paths between incoming and outgoing lines and equipment for selectively controlling the network. The control equipment responds to service request signals from an incoming line and selects an available path through the network to the desired outgoing line.

Depending upon the complexity of the system, many paths through the network are generally available between the two lines designated for interconnection. Also, these paths may be made up of a plurality of links which can be interconnected in numerous combinations to form a completed path. Because of the many variables, it is uncertain that a selected path is suitable for service unless some tests are performed after the path is established. While arrangements are well known in the prior art for testing the communication path selected for a particular call, these arrangements lack certain of the novel features which have been incorporated in the present invention.

For example, many of the prior art systems merely test a communication path for the presence of foreign potentials. If a foreign potential exists on a path, this may indicate that the path is crossed with another path or a double connection exists. In any event, the control equipment would release the established path and attempt to establish a different one.

In networks wherein a plurality of links are serially interconnected between the incoming and outgoing lines, a test is generally made to determine if the necessary links have been actuated to provide a continuous path between the two lines. In many of these systems, the continuity of the path is checked by testing a control wire in each link. These tests, of course, do not indicate the condition of the transmission path. In other systems where a test is made of the transmission path, the test is generally made across the office, that is, the test is limited to the central office network and does not include the incoming and outgoing lines. Furthermore, the tests usually do not measure the transmission qualities of a path, but merely determine if the selected path has been established.

SUMMARY OF THE INVENTION

In accordance with the one illustrative embodiment of the invention, a switching office is arranged to perform the continuity and transmission tests on a communication path prior to using the path for communication. The tests are performed on the network links and incoming and outgoing lines, so that a path is tested from end to end before interconnecting the communication circuits.

The arrangement is particularly useful in a wideband communication system wherein customer stations are interconnected for voiceband and wideband service such as visual telephone service. In one known system, which is disclosed in the copending application of M. D. Van Fossen—J. G. Whitemyer, Ser. No. 9,691, filed Feb. 9, 1970, wideband and voiceband paths are established through separate switching networks by common control equipment. The voiceband path includes a two-wire bidirectional transmission path, while the wideband path comprises a four-wire transmission path with one pair of wires being used for transmission in each direction.

When the term "four-wire" is used herein to describe transmission media, it is not intended that the term be limited to metallic conductors. It is well known that carrier systems, radio systems, etc. can be used to provide the equivalent of four-wire transmission.

In the Van Fossen et al. disclosure, communication circuits such as customer stations and trunks are interconnected over one network or both networks, depending on whether voice only or voice and wideband communication is desired. The selection of a path through the networks is made by a marker circuit which establishes the necessary linkages between the communication circuits. Assuming that a customer originates an outgoing wideband telephone call, the marker at the central office would establish an audio network connection between the customer telephone station and an audio outgoing trunk, in addition to a wideband network connection between the customer's wideband equipment and a wideband outgoing trunk.

Before customers are permitted to use the connections, the marker makes continuity and transmission tests to ascertain that the connections are suitable for service.

More specifically, a 12 kilohertz signal is transmitted from the central office over the transmit pair of wires in the four-wire wideband path. This signal traverses the line to a communication circuit at the distant end. The communication circuit might be part of the customer station equipment if a test is being made on the customer line, or the communication circuit might be trunk equipment in a distant switching office if the test is being made on a trunk. The signal sent from the office over the transmit pair is returned to the office over the receive pair by a loopback arrangement in the communication circuit. At the central office, the returned signal is measured by comparing it to signals of known value.

Specifically, the peak amplitude of the received signal must fall within two predetermined threshold voltages in order to indicate a successful continuity and transmission test. These threshold voltages correspond to the allowable deviation from nominal that the 12 kilohertz sine wave is permitted to undergo for the circuit being measured. Thus, the returned signal indicates whether the path is continuous and whether the path has suitable transmission characteristics. If the path is found to be suitable, the loopback is removed and the circuits are interconnected for communication.

The lines served by a switching office have different transmission characteristics, depending in part on their length and the number and type of repeaters employed. Generally, lines serving customer stations are permitted a greater deviation in transmission characteristics than trunk lines. The reason for this is that only two customer lines are involved in most connections while many trunk lines may be interconnected to serve remotely located customer stations. Thus with respect to transmission characteristics, trunks are designed within closer tolerances and can be measured with more sensitive instruments. In accordance with another aspect of our invention, the sensitivity of the measuring circuit is automatically adjusted by the marker according to the type of circuit being tested. For customer line circuits which vary considerably, the allowable deviation would be greater than that allowed for trunk facilities.

The present invention can be employed most advantageously in a communication system which has trouble reporting features and which is capable of initiating alternative actions if trouble is encountered in establishing connections. Thus, each section of the total connection between calling and called customer stations is tested. This would include testing the facilities from a trunk circuit through the originating office network to the calling station, testing the facilities from a trunk circuit through the terminating office network to the called customer station and testing the facilities that are switched through intermediate offices on a tandem basis.

If trouble is detected in any portion of the connection, the arrangement will signal maintenance personnel and the common control equipment will record the trouble and make a second attempt to complete the call. On a second attempt, the system will generally try to use different facilities wherever possible. In the event of a continuity and transmission test failure during a second attempt, the call can be routed to a tone or announcement trunk to inform the calling customer that the call cannot be completed.

The invention can also be used in systems not having the capability of recording troubles or making second attempts. In the event of a continuity and transmission test failure in these systems, the call might be blocked to prevent charging the customer for a call over a defective wideband path, and a tone or announcement might be returned to the calling customer to inform him that the call has blocked.

The present arrangement is also equipped with testing features so that it is put in a self-checking mode when not being controlled by a marker. In this mode, the output of the 12 kilohertz transmitter is connected through predetermined attenuators to the measuring circuit and the allowable deviation of the measured signal is much less than when the circuit is measuring trunks or customer lines.

BRIEF DESCRIPTION OF DRAWING

A better understanding of the arrangement contemplated can be had from the following description made with reference to the drawing in which.

DETAILED DESCRIPTION

Figure 1:
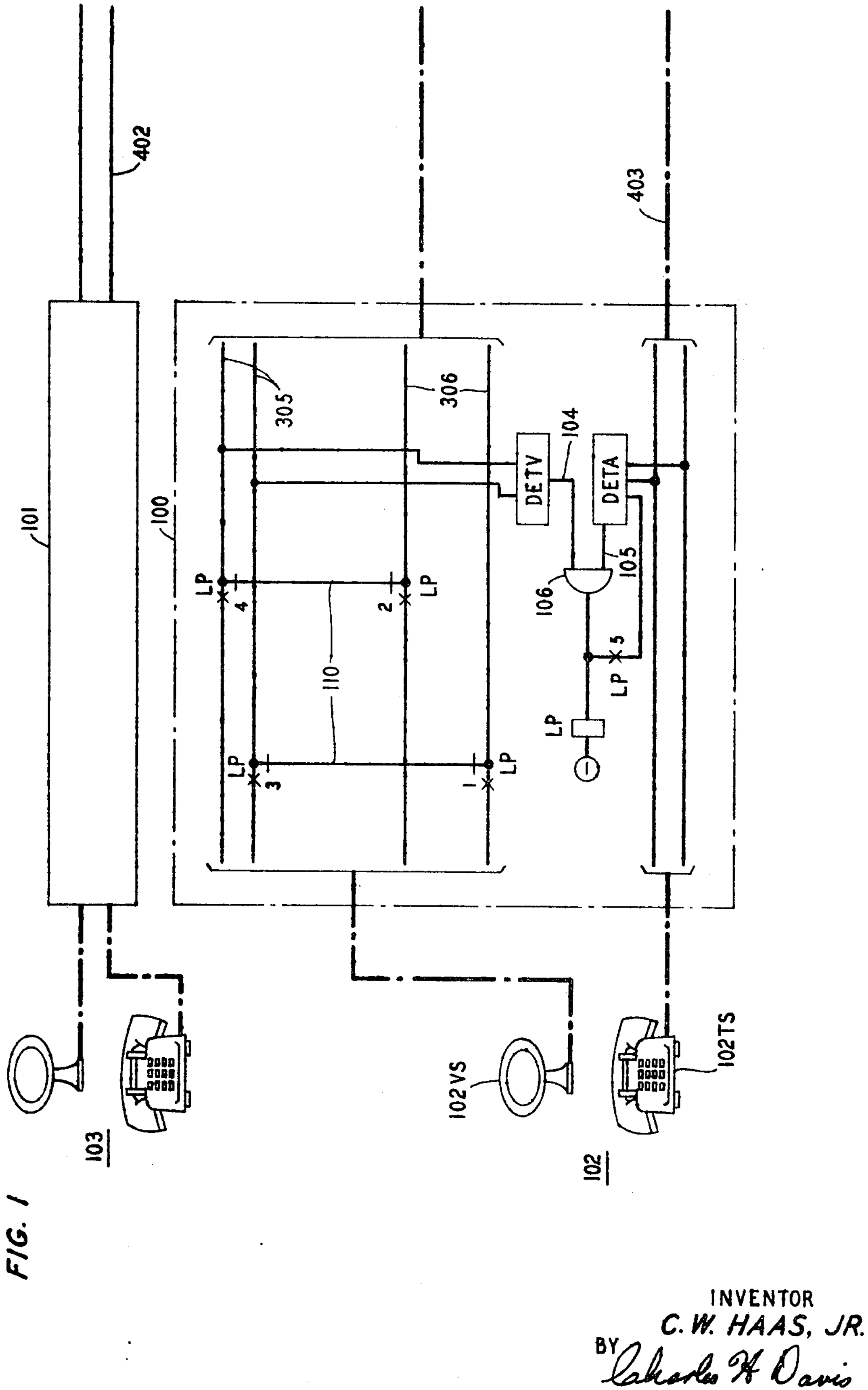
FIG. 1 shows a portion of a plurality of customer station communications circuits.
Figure 2:
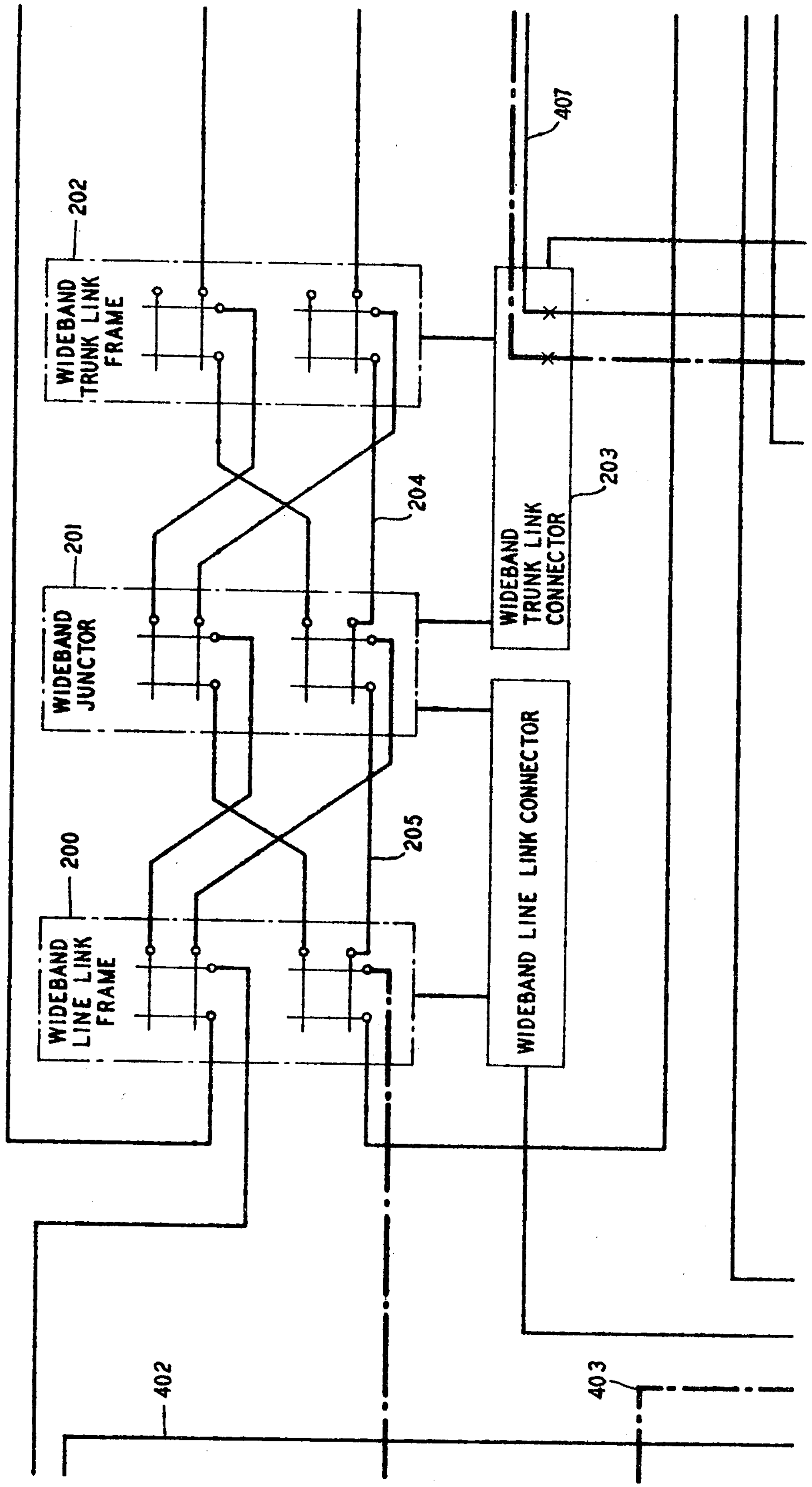
FIGS. 2 and 4 show a portion of a central office switching system.

Before describing the operation of the invention, a brief description of the arrangement of the equipment components will be given.

The one illustrative embodiment of the invention is disclosed in a combined wideband-voiceband switching system of the type set forth in the aforementioned M. D. Van Fossen et al. disclosure. This switching system incorporates two independently controlled crossbar switching networks referred to as an audio network and a wideband network. The audio network is used for interconnecting telephone stations for voice communication, while the wideband network is used for furnishing wideband service. When wideband and voiceband service is required simultaneously, such as on a visual telephone call, communication paths through both networks are concurrently established.

The audio network comprises a plurality of line link frames such as 400, and trunk link frames such as 401. Each of these frames comprises a primary and secondary switching stage. Communication circuits 100 and 101 serving customer stations 102 and 103 are connected over voice lines 402 and 403 to the primary switches on the line link frames while communication circuits such as trunk circuits 500 and 300 appear on the primary switches of the trunk link frames. The two-way audio interoffice trunks also have appearances on a line link frame to facilitate trunk-to-trunk connections. When actuated, the crossbar switches of the audio network provide a two-wire bidirectional transmission path between the communication circuits that are designated for connection.

The wideband network comprises wideband line link frames such as 200, wideband junctor switch groups such as 201, and wideband trunk link frames such as 202. The wideband portions of the communication circuits 100 and 101 also appear on the switches of the wideband line link frames, while the communication circuits such as wideband two-way trunks 301 and 302 are connected to switches on the wideband trunk link frame. The wideband two-way trunks are similar to the audio two-way trunks and have appearances on the wideband line link frame for establishing wideband trunk-to-trunk connections. The wideband network establishes a four-wire transmission path between two communication circuits and a pair of wires is used for transmission in each direction. Of course, associated with the transmission paths in each network are control conductors for testing the availability of the paths and for controlling the switches in the network. Part of these control conductors is shown in trunk circuits 301 and 500.

The networks are under control of a plurality of marker circuits. Only portions of one marker circuit have been shown in FIGS. 4 and 7 to simplify the drawing, and it will be obvious to one skilled in the art that the marker includes additional circuitry for performing many functions not pertinent to the disclosed invention. For a more complete description of a typical marker, the reader is directed to U.S. Pat. No. 2,585,904 to A. J. Busch of Feb. 19, 1952 or to the aforementioned M. D. Van Fossen et al. disclosure.

In addition to controlling the audio and wideband networks, the marker controls the interconnection of trunks with registers and senders, and the marker performs various tests on this equipment before customers are permitted to use the equipment for communication.

Figure 6:
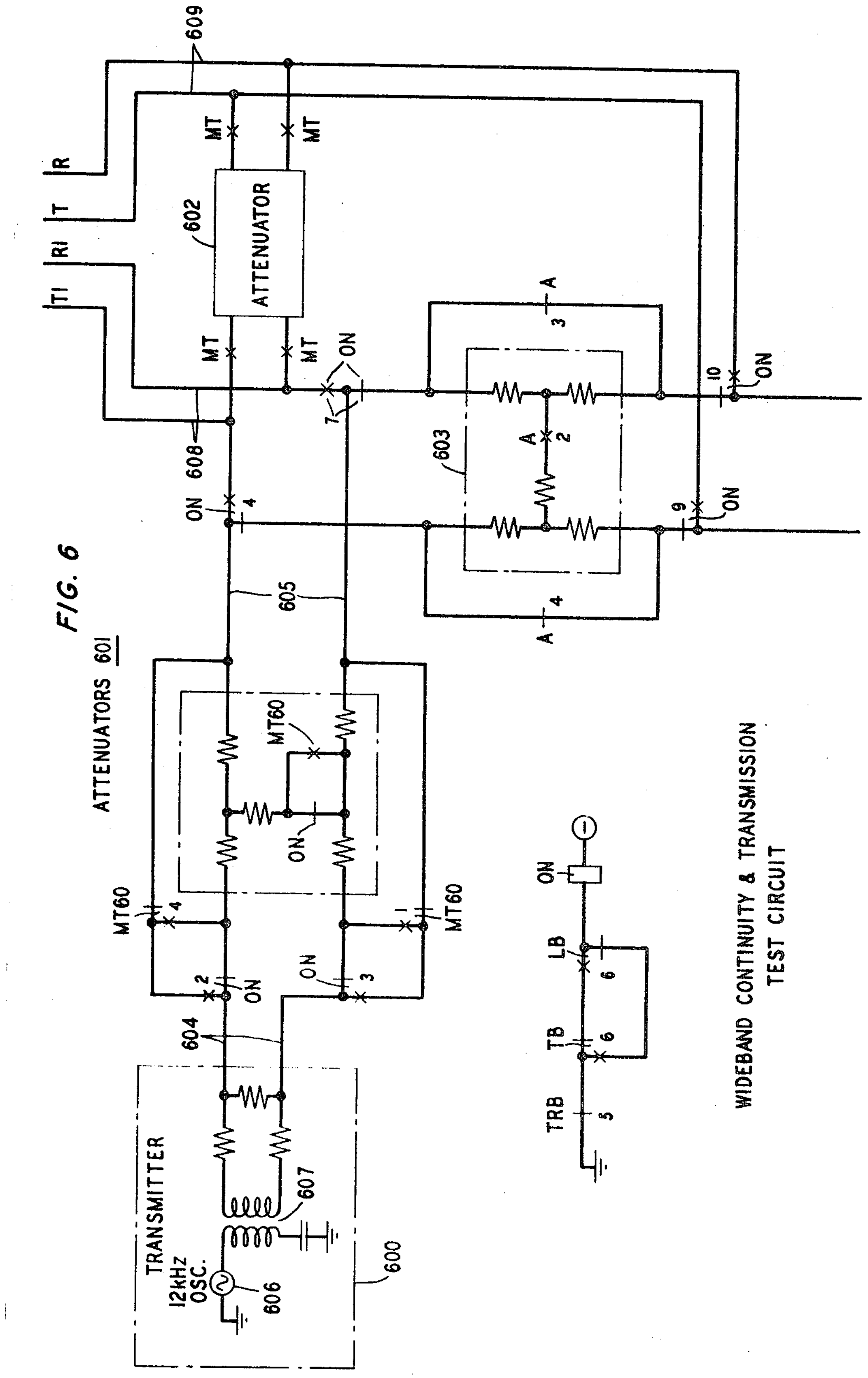
FIGS. 6 and 7 show a portion of a continuity and transmission test circuit and part of the central office switching system and FIG. 8 shows the arrangement of FIGS. 1–7.
Figures 7, 8:
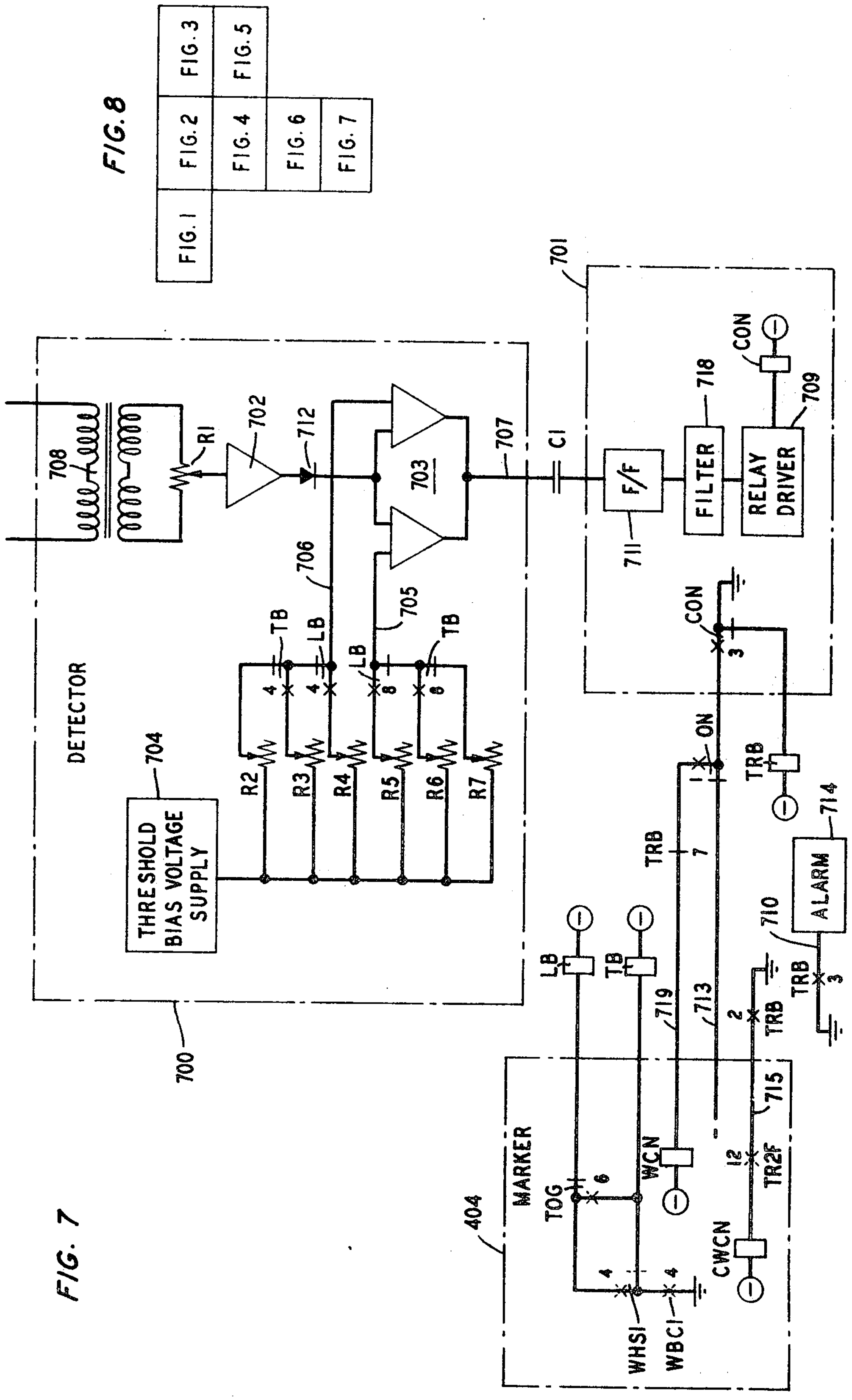

Cooperating with marker 404 is a wideband continuity and transmission test circuit, part of which is shown in FIGS. 6 and 7. This test circuit comprises a signal transmitter 600, attenuators 601, 602 and 603, detector circuitry 700 and output circuitry 701. The components of the continuity and transmission test circuit have been shown on block diagram form, since each of these elements is known in the prior art. However, in order for the reader to understand the function of the elements that are represented symbolically in a drawing, a brief description will be given of each of these elements.

Transmitter 600 comprises a signal generator 606 (such as a Colpitt's oscillator) with an adjustable inductor to allow for the exact setting of the frequency of oscillation. Oscillator 606 operates from a regulated voltage supply which can be adjusted to determine the amplitude of the transmitted signal. The output of oscillator 606, 12 kilohertz, is connected through transformer 607 and attenuators 601 to the transmission path being tested.

A signal returned over the transmission path under test is measured by the detector 700 which comprises amplifier 702, comparator 703 and threshold bias voltage supply 704. Amplifier 702 comprises an operational amplifier and associated circuitry which provides the gain necessary to increase the received signal amplitude to a magnitude required to operate comparator 703. Potentiometer R1 is used to set the gain of the amplifier during calibration.

The sine wave output of amplifier 702 is rectified by diode 712 and the positive half cycles are applied to the dual comparator 703. Comparator 703 compares the amplitude of the positive half cycles of the received signals with two threshold voltages which represent the maximum and minimum acceptable levels for the facility being measured. The threshold voltages are derived from voltage supply 704 and variable resistances R2–R7. These voltages are connected over conductors 705 and 706 to the comparator circuit, with the lower threshold voltage being on conductor 705 and the higher voltage being on conductor 706. Thus, the two threshold values define a so-called "window" within which the amplitude of the input signal must fall. Each time the amplitude of the input signal falls between the two threshold values applied to the comparator circuit, the output on conductor 707 will be switched from its normally high state to a low state. In other words, the output waveform on conductor 707 would be constant if the input is below the lower threshold, while the output on conductor 707 would be a 12 kilohertz square wave corresponding to the 12 kilohertz sine wave input if the amplitude of the input is within the upper and lower threshold values. If the input amplitude exceeds both the lower and upper threshold voltages, the output waveform would have two negative pulses for each half wave cycle of the input, that is, the output would be a 24 kilohertz square wave.

The output of the comparator circuit 703 is transmitted over conductor 707 through capacitor C1 to flip-flop 711. Flip-flop 711 changes its output every time its input goes through a negative transition. Thus, the output of the flip-flop is a 12 kilohertz square wave if the input to the detector is too high; the output of the flip-flop is constant if the input signal to the detector is too low, and the output of the flip-flop is a 6 kilohertz square wave if the input signal is within tolerance. The output of flip-flop 711 is applied to filter 718. Filter 708 will only pass a narrowband of frequencies (approximately 6 kilohertz) which indicates a satisfactory test. The 6 kilohertz output from filter 708 is connected to relay driver 709, which sufficiently amplifies the signal to operate relay CON, and it is the output of relay CON that signals the marker whether or not a satisfactory test has been performed.

When the wideband continuity test circuit is in its and and state, it is placed in a self-checking mode. More specifically, in its standby state, relay ON in FIG. 6 is normal, and the output of oscillator 606 is coupled through transformer 607, over conductors :04, through break contacts ON–2 and ON–3, through attenuators 601, over conductors 605, through break contacts ON–4 and ON–7, through attenuator 603 and break contacts ON–9 and ON–10, through transformer 708 to amplifier 702 in detector 700. In its standby state, relays LB and TB in FIG. 7 are normal, and the upper and lower threshold bias voltages for the comparator circuit are obtained from voltage supply 704 and resistances R2 and R7.

If the signal from transmitter 600 is at the right level, relay CON in FIG. 7 will be operated and connect ground through its make contacts CON–3, break contacts ON–1 and over conductor 713 to the marker. This indicates to the marker that the continuity test circuit is performing satisfactorily in the self-checking mode. If trouble should develop in the test circuit while the test circuit is in a self-checking mode, relay CON releases to operate slow operate relay TRB. Relay TRB extends ground over conductor 710 to actuate alarm circuit 714, thereby informing the maintenance personnel that a failure has occured in the test circuit. Relay TRB also extends ground over conductor 715 to make contacts TR2F–12. Relay TR2F is operated in the marker if the marker fails during its initial attempt to set up a call. With relay TR2F operated, relay CWCN would operate to cause the marker to cancel wideband continuity testing features. In addition, relay TRB also extends over conductor 713 to the marker. This circuit is used when the continuity and transmission test circuit is under routine maintenance tests and these tests will not be described herein.

The operation of the test arrangement under control of the marker will now be described and for this purpose, let it be assumed that the customer at station 102 originates a visual telephone call to a customer served by another switching office which has not been shown in the drawing. To originate a visual telephone call, the customer at station 102 lifts the receiver of his telephone set 102TS and transmits the address of the called station preceded by a special prefix digit which indicates that the call is a visual telephone call.

The equipment at the central office responds to the off-hook condition and connects the calling telephone set 102TS to an originating register (not shown) which records the address of the called station. The register then seizes marker 404 and forwards the calling line equipment location and the called address to the marker, so that the marker can continue processing the call.

On originating calls in the switching system being described, the marker first selects idle outgoing trunk circuits and then seizes the line link frames associated with the calling line circuit 100. Once the frames on which the circuits that are designated for connection have been seized by the marker, the marker selects and establishes an idle audio channel between the audio circuits and an idle wideband channel between the wideband circuits.

During the process of selecting an idle trunk, relay WBC1 in the marker will be operated and with relay WBC1 operated, ground is extended through make contacts WBC1–4 in FIG. 7, break contacts WHS1–4 and through the winding of trunk bias relay TB to battery. Relay TB operates and changes the upper and lower threshold bias voltages that are connected to comparator 703 so that the comparator is ready to test the continuity and measure the transmission quality of a trunk facility.

Relay TB also completes an obvious circuit in FIG. 6 for operating relay ON. At its make contacts, ON–4 and ON–7 in FIG. 6, relay ON connects transmitter 600 to conductors 608 and at its make contacts ON–9 and ON–10 detector 700 is coupled to conductor 609. With relay ON operated, the wideband continuity test circuit has now changed from its standby self-checking mode to a mode ready for testing trunk facilities.

In order to establish a connection to the selected audio and wideband trunk circuits, the marker seizes control of the trunk link frames on which the audio and wideband trunks appear. The marker operates the appropriate audio and wideband trunk link connectors 405 and 203 respectively, and these connectors extend a plurality of test and control leads from the trunks and trunk link frames to the marker. A trunk select relay operates in the marker, and at its contacts TS–3 in FIG. 4 extends battery through contacts DCT1–3, over conductor 406, through trunk link connector 405 to FIG. 5, through trunk equipment not shown, through the winding of relay 5F, break contacts S1–1, back over conductor 501 to ground on contacts TGO–1 in FIG. 4. Relay 5F operates and transmits ground through its contact 5F–10, through equipment not shown and over conductor 302 to operate relay 3F in the wideband two-way trunk circuit. Relay 5F also completes an obvious path for operating relay SG in FIG. 5 and relay SG extends ground through its make contacts SG–7 and over conductor 313 to operate relay PL in FIG. 3.

Figure 3:
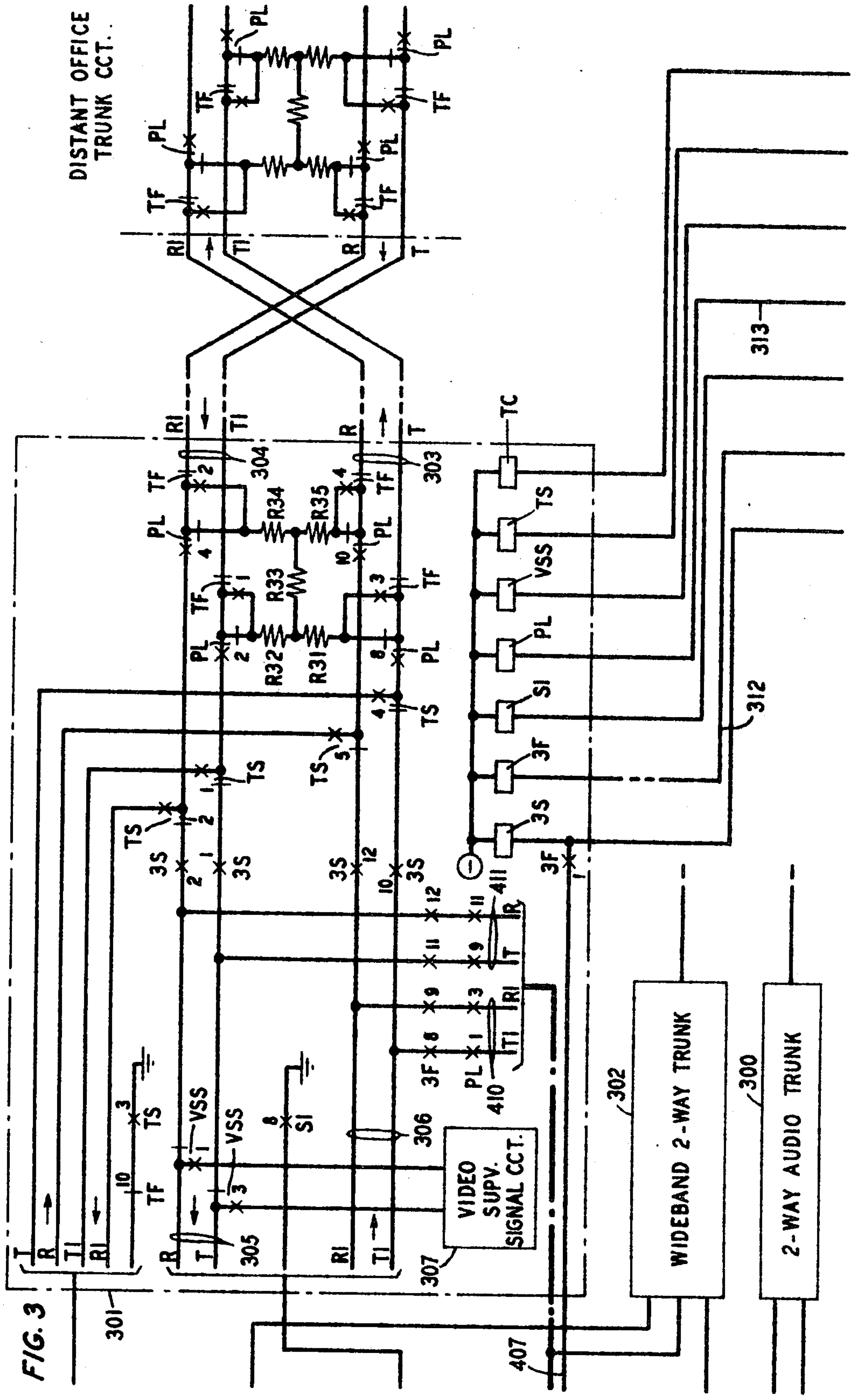
FIGS. 3 and 5 show portions of a plurality of trunk circuits.

Relay PL operates its contacts PL–2, P1–4, P1–8 and PL–10 in FIG. 3 to remove the loopback pad comprising resistances R31–R35 and complete a path over the trunk conductors to the distant office. This pad is not used on outgoing calls, but on incoming calls from the distant office, the pad serves to return the continuity test signal transmitted from the distant office.

Wideband class of service relay WLC (not shown) operates in the marker as soon as the marker determines that this is a wideband call. With the wideband trunk link connector 203 operated and relay WLC operated, ground is extended through contacts WLC–4 in FIG. 4, through break contacts ITR3–7, WCK–7 and RWCN–7, over conductor 407, through the wideband trunk link connector 203 to FIG. 3, through make contacts 3F–1 in wideband trunk circuit 301 and through the winding of relay 3S to battery. Relay 3S operates and closes its contacts 3S–1, 3S–2, 3S–10 and 3S–12 to complete a circuit for making continuity and transmission tests on the trunk facility. At this time, the channel through the wideband network to the calling line has not been established.

Oscillator 606 in FIG. 6 transmits its 12 kilohertz signal through transformer 607, over conductors 604, through make contacts ON–2 and ON–3, break contacts MT60–4 and MT60–1, over conductors 605, through make contacts ON–4 and ON–7 and over conductors 608, through break contacts RWCN–1 and RWCN–2 in marker 404, over conductors 410 and through wideband trunk link connector 203 to wideband trunk circuit 301. In the trunk circuit the signal is transmitted through contacts PL–1, PL–3, 3F–8 and 3F–9, through make contacts 3S–10 and 3S–12, through break contacts TS–4 and TS–5, through make contacts PL–8 and PL–10, through break contacts TF–3 and TF–4 and over trunk conductors 303 to the trunk circuit at the distant office.

For the purposes of this description, it can be assumed that the trunk circuit at the distant office is identical to the trunk circuit 301 shown on FIG. 3. At the distant office, the 12 kilohertz tone passes through a loopback arrangement equivalent to the loopback pad comprising resistances R31–R35 shown in FIG. 3. Of course it will be realized that the transmit pair of each office is connected to the receive pair of the other office. The signal returned from the distant office is, therefore, received over conductors 304 in FIG. 3 and transmitted through break contacts TF–1 and TF–2, make contacts PL–2 and PL–4, break contacts TS–1 and TS–2, make contacts 3S–1, 3S–2, 3F–11, 3F–12, PL–9 and PL–11, over conductors 411 through the wideband trunk link connector 203, through break contacts RWCN–3 and RWCN–4 and over conductors 609 to FIG. 6 and through make contacts ON–9 and ON–10 to transformer 708. The signal passing through transformer 708 is amplified by amplifier 702, rectified by diode 712 and connected to the input of comparator 703.

It will be recalled that trunk bias relay TB was previously operated by the marker and with relay TB operated, the threshold bias voltage for comparator 703 is supplied to variable resistance R3 and R6. With comparator 703 biased in this manner, the allowable deviation from nominal of the measured signal is less than when a subscriber line is being tested.

Assuming that the received signal is within the allowable limits, that is, higher than the lower threshold value and lower than the higher threshold value, then the output of flip-flop 711 is a 6 kilohertz square wave which will pass through filter 708 and cause relay CON to operate. Relay CON closes its make contacts CON–3 transmitting ground through make contacts ON–1, break contacts TRB–7 and over conductor 712 to operate relay WCN in the marker.

While the marker has been making a continuity and transmission test of the trunk facility to the distant office, the marker has also been selecting an idle channel for interconnecting communication circuit 100 with the trunk. Assuming that an idle channel has been selected, then relay WCN signals the marker to actuate the appropriate select magnets in both the wideband and audio network. This is accomplished by relay WCN closing its contacts WCN–1 to operate relay WCK in FIG. 4. Relay WCK, in operating, opens its contacts WCK–7 in FIG. 4 to release relay 3S in wideband trunk circuit 301. With relay 3S released, trunk conductors 303 and 304 which extend to the distant office are disconnected from the continuity and transmission test circuit and relays CON and WCN release. Relay WCK, however, remains locked, operated through its contacts WCK–10 to prevent relay 3S from reoperating at this time.

As is well known in crossbar systems, select magnets associated with horizontal conductors and hold magnets associated with vertical conductors must be actuated to complete a connection through the crossbar switch. The operation of the hold magnets in the various networks is delayed by a timing circuit (not shown) in the marker. This is to allow time for all network select magnets to operate. At the end of the time interval relay WHS1 operates, causing the operation of the hold magnets in the wideband network. Relay WHS1 also actuates its transfer contacts WHS1–4 in FIG. 7, thereby releasing relay TB and operating line bias relay LB in the continuity and transmission test circuit. With relay TB released and relay LB operated, the upper and lower threshold bias voltages supplied to comparator 703 are changed so that a subscriber line facility can now be tested.

Figure 4:
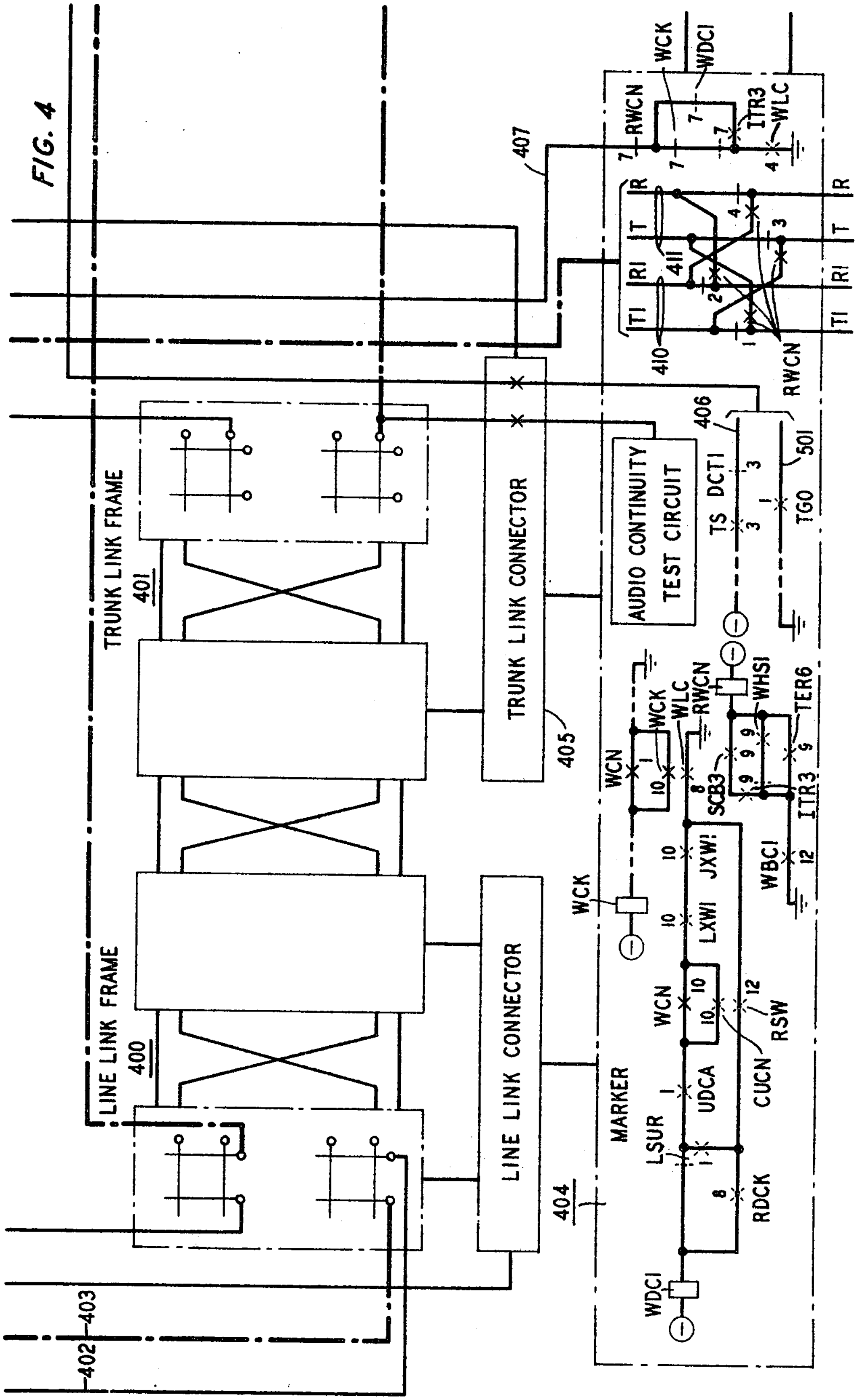

Relay WHS1 also closes its contacts WHS1–9 in FIG. 4 to complete a path for operating reverse wideband continuity test relay RWCN. Relay RWCN, in operating transposes the transmit and receive pairs between the wideband continuity test circuit and the wideband trunk so that the 12 kilohertz signal is sent to the calling station over the receive pair of the calling station.

With the channel established between the calling subscriber station 102 and trunk circuit 301, a continuity and transmission test can now be made toward the subscriber station. The 12 kilohertz signal from oscillator 606 is transmitted over the previously traced path to conductors 608 in FIG. 4, through make contacts RWCN–1 and RWCN–2 and over conductors 411 and through the wideband trunk link connector 203 to FIG. 3, through make contacts PL–9, PL–11, 3F–11 and 3F–12 and over conductors 305. Conductors 305 are extended through the wideband network via trunk link 204 and line link 205 to communication circuit 100, through break contacts LP–3 and LP–4 through a loopback comprising conductors 110, through break contacts LP–1 and LP–2 and back over conductors 306 through the wideband switching network to FIG. 3, through make contacts 3F–8, 3F–9, PL–1 PL–3 and over conductors 410 through the wideband trunk link connector 203, through make contacts RWCN–3 and RWCN–4, and over conductors 609 and the previously traced path to detector 700.

Comparator 703 is now operating with the threshold bias voltage being supplied through variable resistances R4 and R5. This allows the measured signal to deviate from normal, a greater amount than when trunk facilities are being tested. Also, the threshold is adjusted to compensate for the absence of the resistances normally inserted in the loopback pad found in trunk circuits such as 301. If the wideband channel and the line facilities to the customer station are satisfactory, relay CON and marker relay WCN operate once again.

During the time that the marker was performing a continuity and transmission test on the wideband line, the marker was also performing a test on the audio channel. This test is described in the aforementioned Busch disclosure and the description need not be repeated herein.

Since this is a call to a distant office, the marker also selects a sender such as 501 and interconnects the sender with the audio trunk circuit via outgoing sender link 502. The marker also forwards the called telephone number to the sender which will outpulse the number when the distant switching office is ready to receive it. When the sender is connected to the trunk, the sender operates trunk relay SD in FIG. 5, and relay SD causes relay VSC in FIG. 5 to operate.

After the marker has finished the various tests, relay DCT1 operates in the marker to begin the release of the marker and relay DCT1 releases relay 5F in the audio two-way trunk circuit 500. With relay 5F released and relay VSC operated, an obvious circuit is completed for operating relay VSS in the wideband trunk circuit 301.

At its contacts VSS–1 and VSS–3, relay VSS connects video supervisory signal circuit 307 to conductors 305. The supervisory signal generated by circuit 307 is of the same waveform as the signal generated by a video transceiver at the customer station. The signal is initially transmitted to a station by the central office for the purpose of turning on the station video apparatus. After stations have been interconnected, the signal is generated by the station apparatus and is used for synchronizing the transmission of video signals between the stations. When the signal is initially transmitted to a called station by the central office, the signal also causes the station to be rung with a distinctive ring, indicating a visual telephone call.

The video supervisory signal also causes the loopback to be removed from the calling customer's line. For example, communication circuit 100 includes detectors DETV and DETA. Detector DETV is responsive to the video supervisory signal on conductors 305 and transmits a signal over conductor 104 while detector DETA is responsive to the supervisory condition on audio line 403. In other words, when the telephone set 102TS is off hook, detector DETA transmits a signal over conductor 105. With signals on conductors 104 and 105, AND gate 106 is enabled and relay LP operates. At its contacts LP–1 through LP–4, relay LP disconnects the loopback and extends the four-wire transmission path to the video transceiver 102VS. The calling station 102 is now connected via the audio and wideband networks to the audio and video trunk circuits.

At this point marker 404 has released from the connection, and the connection is under control of the calling station and sender 501. Sender 501 now waits for a register to be attached to the audio trunk at the distant office.

Figure 5:
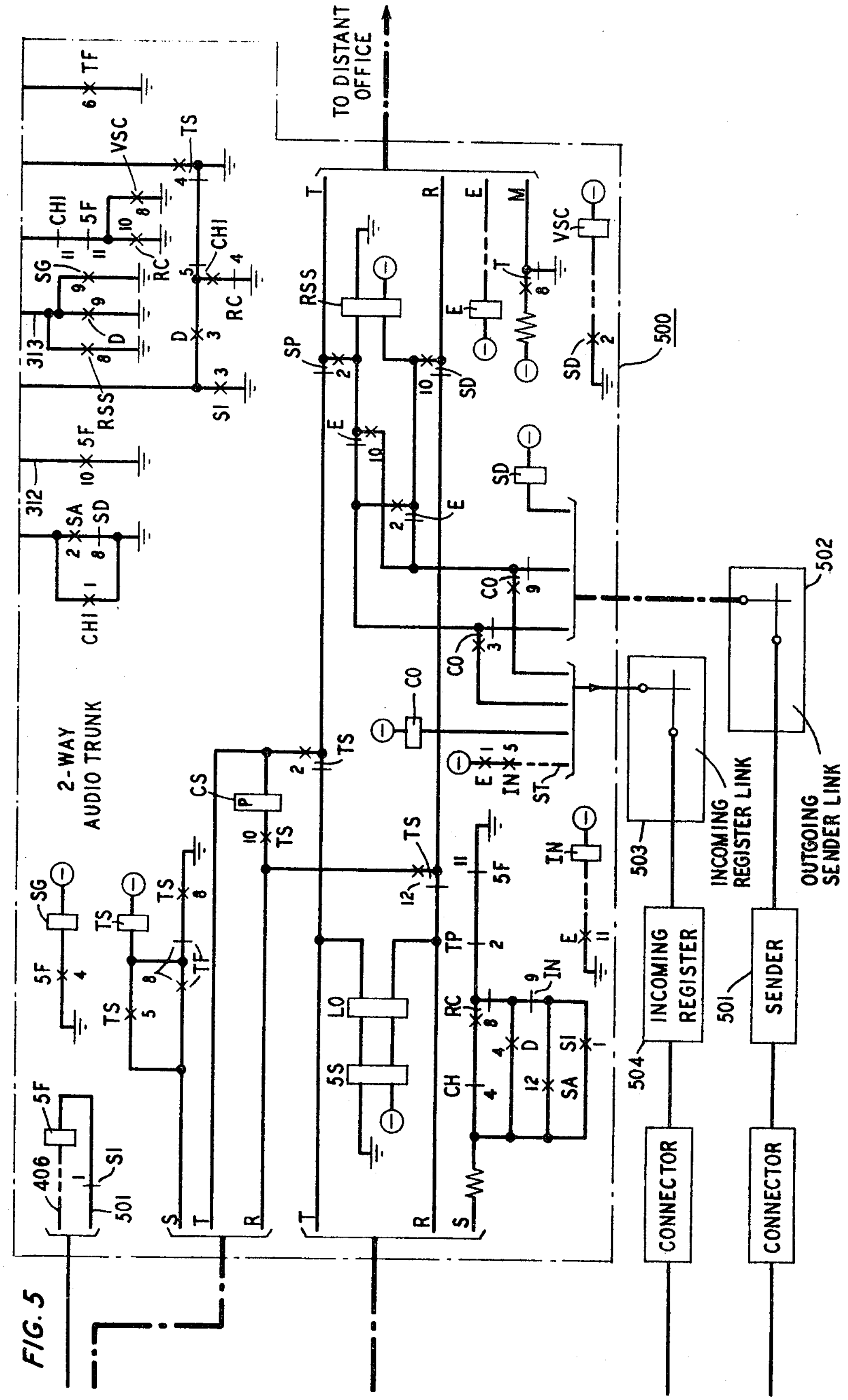

As mentioned above, the trunk circuits at the distant office are assumed to be identical to trunk circuits 301 and 500 shown in FIGS. 3 and 5, respectively. When the audio trunk circuit 500 is seized, relay T (not shown) operates to connect battery to lead M in FIG. 5. The trunk circuit being shown uses the well-known "E & M" type signaling and battery on lead M of trunk circuit 500 is construed as an off-hook seizure signal. At the distant office the seizure signal is received in the form of ground on an E lead similar to lead E in FIG. 500. This causes relay E at the distant office to operate and relay E operates relay IN. With relays E and IN operated at the distant office, a circuit is completed for seizing an incoming register via the incoming register link. This circuit is similar to the circuit in FIG. 5 which includes battery through contacts E–1 and IN–5, equipment not shown and conductor ST to incoming register link 503. Relay CO in the trunk is operated when an incoming register such as 504 is attached. When the register is ready to receive the digits outpulsed from the originating office, the register operates relay RSS in the trunk circuit.

As can be seen in FIG. 5 relay, RSS closes its contacts RSS–8 to extend ground over conductor 303 to the wideband trunk circuit to operate relay PL. When relay PL operates in the wideband trunk circuit of the distant office, it removes the loopback arrangement similar to resistances R31–R35 and partially extends the two interoffice transmission channels to the wideband trunk link frame in the distant office.

While the above description only illustrated the continuity and transmission testing features on an outgoing call, it will be understood that similar tests are performed on other types of calls. For example, on an incoming call a similar test is made across the wideband network from the incoming wideband trunk circuit to the called customer's communication circuit. No test need be made of the incoming trunk conductors since these were verified by the tests made at the originating office. On a trunk-to-trunk connection, the outgoing trunk is tested as described above, and a test is also performed across the office network from the outgoing trunk circuit to the loopback pad in the incoming trunk circuit. In this case both relays TS and TF would be operated in the wideband trunk to connect the pad to the wideband line link appearance of the trunk. On intraoffice calls, continuity and transmission tests are performed from the wideband trunk circuit to both the calling and called customer stations.

It is understood that the above-described arrangements are merely illustrative of the application and principles of the invention. Numerous other arrangements may be devised by those skilled in the art without departing from the spirit and scope of the invention. For instance, the signal transmitted from the central office to measure the transmission characteristics of the four-wire channel might comprises a plurality of different frequencies. Since the transmission characteristics of the channel generally vary with the frequency, using a plurality of frequencies to test the channel would furnish a more comprehensive evaluation of the channel.

Also instead of using a sine wave to test the facilities, a series of polarized pulses could be used with a detector capable of recognizing the proper polarity of the looped back signal. This arrangement would not only ascertain the continuity of the system but would detect any reversal in the transmission path.

Furthermore, the invention is applicable to data type facilities having regenerative repeaters which are triggered by pulses having a minimum amplitude. With data facilities, the illustrative embodiment using a 12 kilohertz sine wave may have to be modified depending on the particular needs of the system.

What is claimed is:

1. In a communication system, a switching office including a switching network, control means for actuating said network, a plurality of communication circuits each having first and second transmission paths connecting each of said circuits to said network and means effective when enabled for coupling the paths of a circuit independently of said network, means actuated by said control means for transmitting a signal from said office over the first path to the coupling means of one of said circuits, said coupling means being effective for returning said signal to said office over the second path of said one circuit, means at said office for comparing said returned signal with a predetermined signal, and means controlled by said comparing means for causing said control means to interconnect said one circuit over said network with another of said circuits.

2. The invention defined in claim 1 wherein said control means includes means for disabling said coupling means.

3. The invention defined in claim 1 wherein said comparing means comprises voltage supply means for establishing potentials of predetermined values representing said predetermined signal and comparator circuit means for comparing said returned signal with said potentials.

4. The invention defined in claim 3 wherein said communication circuits are classified in groups, and wherein said comparing means includes means for selecting said potentials depending on the group classification of the particular circuit returning said signal.

5. The invention defined in claim 4 wherein said comparing means includes means for selectively coupling a first and second one of said potentials to said comparator means, means effective when the amplitude of said returned signal exceeds both said first and second potentials for transmitting a first indication to said control means and means effective when the amplitude of said returned signal exceeds only said first potential for transmitting a second indication to said control means.

6. The invention defined in claim 4 wherein said control means comprises means for selectively coupling said transmitting means to any of said first paths, means for coupling said comparing means to any of said second paths and means for coupling said transmitting means to said comparing means independently of said paths.

7. In a wideband telephone system comprising a switching office including a switching network, a plurality of customer station circuits and trunk circuits, and first and second transmission channels connecting each of said circuits to said network, wherein the improvement comprises an arrangement for testing the transmission characteristics of said channels comprising a transmission bridge in each said circuit connecting the first and second channels associated with said circuit, signal transmitting means, detecting means actuated by signals from said signaling means, first means effective when enabled for coupling said transmitting and detecting means to the first and second channels associated with a selected one of said trunk circuits, means responsive to the initial actuation of said detecting means for disabling said first coupling means, second means for coupling said transmitting and detecting means to the first and second channels associated with a selected one of said station circuits, and control means responsive to the reactuation of said detecting means for causing a network connection to be established between said selected trunk and station circuits.

8. The invention defined in claim 7 wherein said control means comprises means for changing the sensitivity of said detecting means upon operation of said second coupling means.

9. The invention defined in claim 8 wherein said station circuit includes a video transceiver and wherein said control means also comprises means for transferring the first and second channels of said selected station circuit from said bridge to said video transceiver.

10. The invention defined in claim 9 wherein said station circuit includes a telephone set and a voice line coupling said set to said network and wherein said transfer means comprises a first monitoring circuit responsive to a first signal received over one of said channels associated with said station circuit, a second monitoring circuit operative when said telephone set is off hook and means jointly responsive to said first and second monitoring circuit for transferring the first and second channels of said selected station circuit from said bridge to said video transceiver.

11. The invention defined in claim 7 wherein said signal transmitting means comprises a signal generator having a voltage output of a predetermined amplitude, and wherein said detector means comprises a plurality of threshold voltages and means for comparing the amplitude of signals received over said second channels with said threshold voltages.

12. In a communication system including switching offices each having a switching network, a plurality of four-wire trunks including first and second transmission paths between said offices and a plurality of subscriber circuits each coupled to one of said networks via a four-wire loop; a transmission test circuit for testing both said trunk paths and said loops including transmission channels connected therebetween, comprising means for transmitting a signal from one of said offices over the first path of one of said trunks, means for returning said signal to said one office over the second path of said one trunk, detector means including means for comparing said returned signal to a standard signal, means controlled by said detector for interconnecting over one of said transmission channels said one of said trunks with one of said subscriber loops, and means responsive after the operation of said interconnecting means for reoperating said transmitter means and for causing said detector means to vary the sensitivity of said comparing means whereby the allowed deviation detected is greater.

13. In a communication system, the transmission test circuit in accordance with claim 12 further comprising means for placing said test circuit in a self-checking mode comprising means for directly connecting said detector means to said transmitter means and means further to vary the sensitivity of said comparing means whereby the allowed deviation detected is less.

* * * * *